(No Model.)

R. HAGEN.
FAUCET.

No. 498,787. Patented June 6, 1893.

Witnesses:

Inventor:
Rudolf Hagen
By Smith & Osborn
Att'ys

United States Patent Office.

RUDOLF HAGEN, OF SAN FRANCISCO, CALIFORNIA.

FAUCET.

SPECIFICATION forming part of Letters Patent No. 498,787, dated June 6, 1893.

Application filed August 26, 1892. Serial No. 444,149. (No model.)

*To all whom it may concern:*

Be it known that I, RUDOLF HAGEN, a citizen of the United States, residing at San Francisco, in the county of San Francisco and State of California, have invented a new and useful Improvement in Bung-Valves for Barrels and Kegs, of which the following is a specification.

My invention relates to improvements made in the valved stoppers for the bung-holes in kegs, barrels and casks mainly adapted to the drawings of fermented liquors such as beer.

The improvements comprise certain novel construction and combination of parts to produce a faucet wherein the wooden plug or spigot to stop the cask is entirely dispensed with and the contents of the cask broached by means of a key made integral with and forming part of the faucet.

The said improvements and the manner in which I construct and apply the same in the production of a faucet are fully described in the following specification in which reference is had to the accompanying drawings:—

Figure 1:
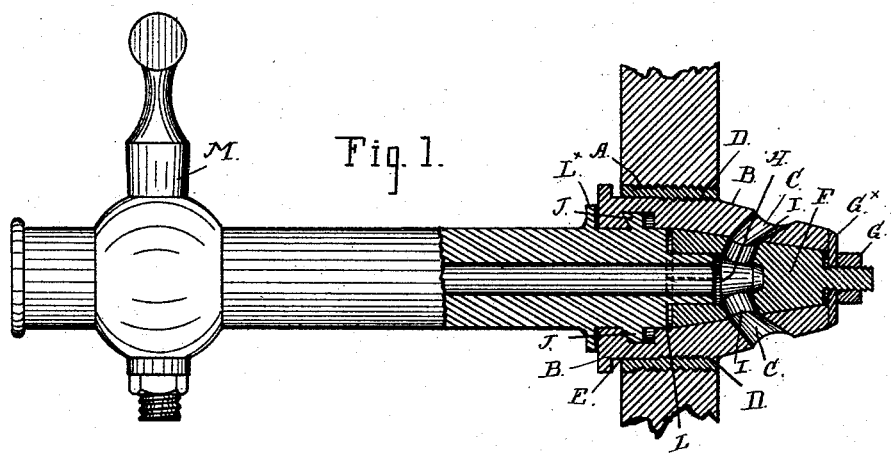
Figure 4:
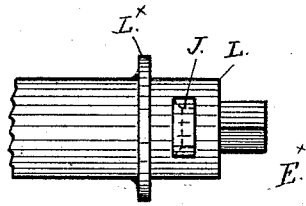
Figures 2, 3:
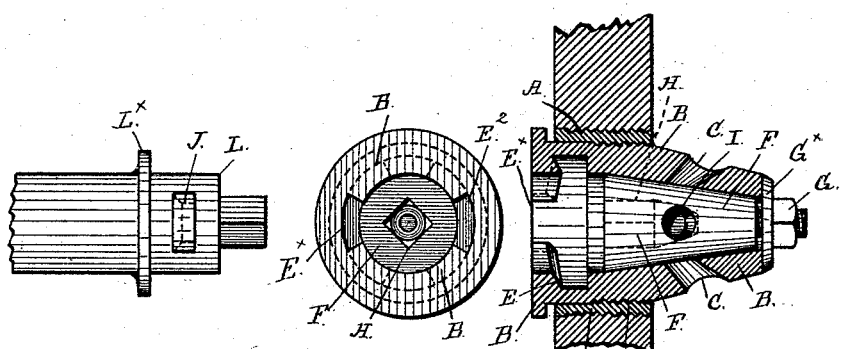

Figure 1 is a view in vertical section of the bushing and faucet with part of the faucet in elevation. Fig. 2 is a vertical section of the bushing and plug or valve in closed position. Fig. 3 is a front or top view of the valve, and Fig. 4 is a plan view of the tap or faucet with part broken away.

The lining or thimble A of the bung hole is screw-threaded upon the outside in the usual way, while the inner portion or interior is only threaded in parts to receive the bung stopper by corresponding threads. This bung-stopper forms the barrel B of the valve, for which purpose its rear or inner end is made conical, and is provided with two ports C, C, inclining inwardly toward the center of the valve and is coupled with the thimble or partly threaded bushing by means of the partly threaded screw D. An inclined groove E is made in the shell and diametrically opposite openings $E^x$ $E^2$ extending from the front end of the stopper back to the same in which corresponding lugs of the faucet or key enter to operate the valve, as will be presently described. The valve F is made conical to closely fit the conical chamber of the stopper and is held in position by a threaded spindle and nut G with an intermediate washer $G^x$ bearing against the inner end of the stopper in such a manner that it may be turned in either direction. It will be seen that when this nut and washer are removed, the entire valve or plug F can be withdrawn bodily from the conical portion or valve-seat, passed through the shell-like portion at the front end of the stopper, and taken entirely out of the barrel B without the necessity of removing the latter from the thimble A or of withdrawing any other part of the device providing of course that the key described below is first withdrawn. It is chambered as at H and two ports I, I, are formed in the plug to correspond with the ports in the shell.

The tap or faucet is piped from the inner end to the cock or draw-off plug and is provided with outwardly opposed lugs J, J, which can be passed into the groove E of the shell through openings $E^x$ $E^2$, and a square key formed on the end enters the square chamber H and makes a close connection with the ports I, I, of the valve, the shoulder L abutting against the end of the valve. A collar $L^x$ around the faucet makes a close contact with the valve-chamber by means of a washer and will form a water tight connection at these points.

In operation by inserting the key at the end of the tap or faucet in the square or rectangular chamber and giving it a one quarter turn the ports in the valve will be brought in line with the ports of the barrel and the liquor will flow through the ports into the pipe of the tap or faucet and pass out through the cock or plug M in continuous manner without interruption. The location of the ports of both the valve and valve-chamber are at such an incline as to reduce friction and resistance of the liquid or fluid passing through them to a minimum, while the valve is pivoted to the end of the barrel or valve-chamber in such a manner that it can be readily operated to bring the ports in exact line with each other and cannot be easily unseated. To remove the key and close the valve a further turn of the tap or faucet is given in a backward or reverse direction which closes all of the ports and permits the faucet to be removed through the opposed openings in the rim of the valve-chamber or shell which leaves the bushing and outer end of the valve-chamber nearly flush with the head of the cask, over which the ordinary revenue stamp is placed and which latter can be mutilated or canceled by the end of the tap. By this construction a faucet is produced of great convenience and utility with a less number of parts than has hitherto been employed in the production of a perfect working implement of this class.

Having thus described my invention, what I claim, and desire to secure by Letters Patent, is—

The herein described bung stopper consisting of a barrel B screwed through the bung-hole and having a conical valve seat within its inner end with inwardly inclined ports, a shell portion at its outer end whose interior diameter is greater than that of the larger end of the conical portion, an annular groove within said shell-portion, and oppositely disposed openings leading from said groove through the front end of the barrel, an inwardly tapering plug having an angular cavity in its front end and oppositely disposed ports leading from said cavity outward and adapted to register with those in the barrel, the plug having a threaded spindle extending beyond the inner end of the barrel, and a washer and nut on said spindle; of a key centrally bored and having an angular inner end adapted to fit the cavity in the plug, and oppositely disposed lugs on said key adapted to enter said openings in the shell and pass into the groove therein, as and for the purpose set forth.

In testimony that I claim the foregoing I have hereunto set my hand and seal.

RUDOLF HAGEN. [L. S.]

Witnesses:
C. W. M. SMITH,
HARRY J. LASK.